Nov. 7, 1939.   W. E. LINCOLN   2,178,592
ANTISKID DEVICE
Filed March 15, 1937
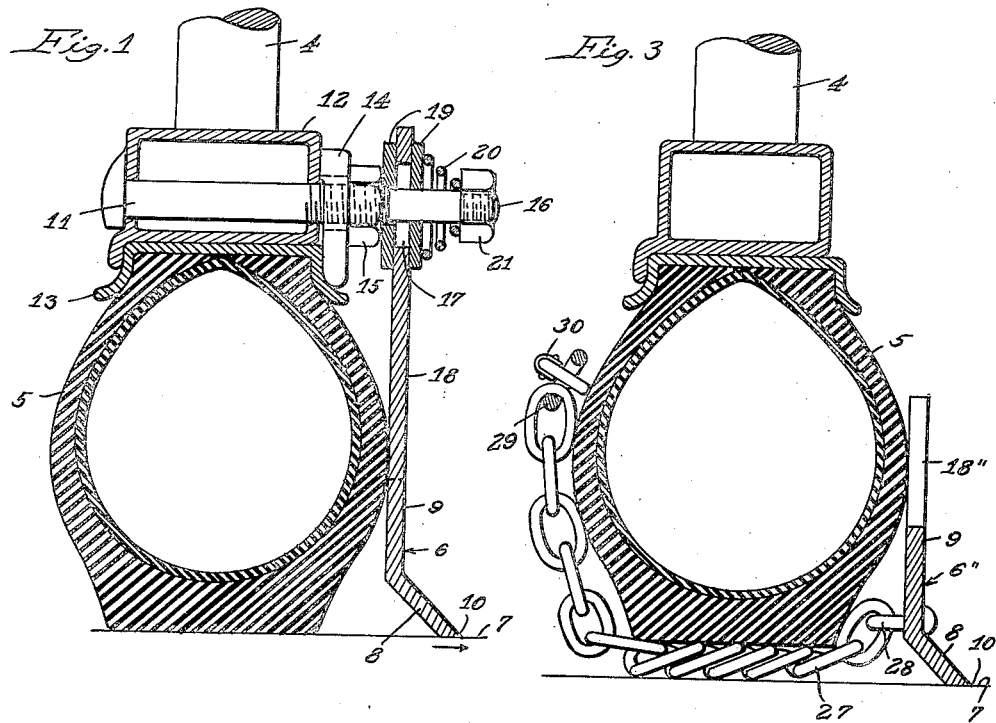
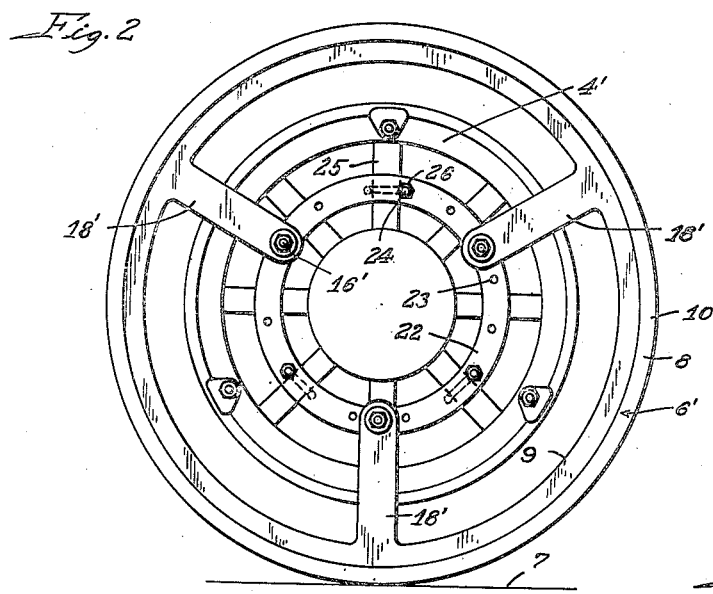
Inventor:
Walter E. Lincoln Patented Nov. 7, 1939

2,178,592

UNITED STATES PATENT OFFICE 2,178,592

ANTISKID DEVICE

Walter E. Lincoln, Belvidere, Ill., assignor of one-half to Jeanne Laws, Rockford, Ill.

Application March 15, 1937, Serial No. 130,950

15 Claims. (Cl. 152—208)

This invention relates to antiskid devices for motor vehicles.

It is well known that the conventional chains used to prevent skidding are not reliable when the roads are unusually slippery, as, for example, when covered with glare ice. As a result, numerous serious accidents have resulted and many lives have been lost. A common analysis of the trouble has been that the chains are apt to give a "sled runner" effect when they happen to come into certain positions at the moment the brakes are applied. However, it is realized, and I believe generally conceded, that chains do serve a useful purpose in so far as giving added traction is concerned, and are therefore useful in getting the car in motion from a standstill, even though they are not thoroughly reliable in stopping, especially under adverse conditions. It is therefore the principal object of my invention to provide a ring-shaped antiskid blade on the side of a wheel having the same continuous engagement with the road surface at all times and arranged to cut into the road surface when given a sidewise motion with the wheel, whereby to prevent skidding.

In accordance with another important object of my invention, the antiskid blades of which there may be one on each of a pair of wheels, acting in opposite directions, or two on opposite sides of one wheel, acting in opposite directions, are mounted in floating self-adjusting relation to the wheels to insure uniformly good contact with the road surface under all conditions and regardless of wear on the periphery of the blades, the blades being incidentally specially formed so that the same form of cutting edge is maintained regardless of the amount of wear.

Still another object of my invention consists in the combination of antiskid or traction chains with antiskid blades made in accordance with the invention, the blades having the cross-links attached at one end thereto so that the circularly extending chains otherwise provided for interconnection of the cross-links on that side of the wheels can be eliminated, their function being served by the blades. This combination is especially advantageous because the chains afford good traction while the blades give protection against skidding.

Other objects and advantages of the invention will soon appear as reference is made to the accompanying drawing, in which—

Figure 1 is a fragmentary sectional view through a rim and felly portion of a wheel and the tire thereon showing an antiskid blade made in accordance with my invention, the same in this instance being attached to the felly;

Fig. 2 is a side view of a complete wheel on a smaller scale showing a complete antiskid ring applied thereto in accordance with the invention, this ring being attached to an adaptor ring secured to the spokes of the wheel, and Fig. 3 is a section similar to Fig. 1, but showing still another form of the invention in which the antiskid blade has one end of the cross-links of an otherwise conventional antiskid chain attached thereto.

Similar reference numerals are applied to corresponding parts throughout the views.

Referring to Fig. 1, 4 designates the wheel and 5 the pneumatic tire thereon alongside which the circular antiskid blade 6 of my invention is arranged to be mounted. The latter is in floating relation to the wheel although caused to turn therewith. In that way, it adjusts itself relative to the wheel in the turning thereof and is sure to engage the road surface 7 at all times. The marginal portion 8 of the blade is bent or curved in angular relation to the inner annular portion 9, so that the peripheral cutting edge 10 will have the right angularity with respect to the surface 7 to tend to cut or dig into the surface instead of merely sliding over it in the event the wheel tends to slide sidewise in the direction of the small arrow. The continuous traction thus afforded will immediately stop the wheel from skidding the moment there is any tendency toward sidewise movement. The angularity of the marginal portion of the blade 6 is also of advantage, because as the periphery of the blade is worn away, it maintains the same form of cutting edge. In fact these rings may, if desired, be sold with rather dull edges with the idea of wearing themselves down to sharper edges. Now, of course, while I have shown just one blade on one side of a wheel, it should be understood that I may use two rings on opposite sides of a wheel, or one on each of a pair of wheels arranged so as to stop skidding in either direction. In other words, the blades of a pair will have their marginal portions 8 extended in opposite directions, so that one stops the wheel from skidding in one direction and its companion works in the opposite direction.

It should, of course, be realized that the blades 6 may be mounted in any one of a number of different ways on the wheels. In Fig. 1, the bolts, one of which is shown at 11 extending through the felly 12 and used for fastening the rim 13 by means of the cleats 14 and nuts 15, have reduced extensions 16 extending through large circular holes 17 provided in the arms 18 extending radially inwardly from the blade 6. Washers 19 fitting closely on the extension 16 of the bolt 11 have engagement with the opposite sides of the arms 18 and keep the blade 6 in the proper plane alongside the tire 5 while permitting free movement of the blade radially and otherwise relative to the wheel, so that the blade is in floating self-adjusting relation to the wheel. There are preferably three arms 18 corresponding generally to the arms 18' appearing in Fig. 2, but, of course, of shorter length, as appears in Fig. 1, and in the case of each of the arms 18, a conical or beehive spring 20 held in place by a nut 21 threaded on the end of the extension 16 serves to retain the blade 6 while allowing freedom of movement in the manner specified.

In the construction shown in Fig. 2, a separate ring 22 is provided, which I refer to as an adapter ring for the reason that it is constructed so that it can be fastened to different styles of wheels and thereby avoids the necessity for providing means on the wheels to mount the antiskid blades thereon. This ring 22 has a number of circumferentially spaced holes 23 provided therein through which hooked bolts 24 can be entered to engage the spokes 25 of the wheel 4' to fasten the ring in place, a nut 26 being threaded on the projecting ends of the bolts and tightened against the outside of the ring 22, as shown. Usually three such bolts will be applied to the spokes of the wheel at points between the radial arms 18' of the antiskid blade 6'. The studs 16' projecting from the ring 22 take the place of the extensions 16 previously described. The same arrangement of washers 19 and springs 20 and nuts 21, as above described, will serve to mount the blade 6' on the studs 16', although in this case only one washer 19 will be needed on each stud engaging the outside of the arms 18'. The advantage of this construction over the one shown in Fig. 1, aside from the adaptability to different wheels mentioned, is the fact that the blade 6' has a greater latitude of floating movement by reason of the fact that the studs 16' are closer to the axis of rotation than the extensions 16 in Fig. 1.

In Fig. 3, still another antiskid blade 6'' is shown having short radial arms 18'' arranged to ride against the side wall of the tire 5. This blade requires no fastening means like the blades of Figs. 1 and 2, because it is arranged to be held in place by the anti-skid chain. The blade has one end of the cross-links 27 of an anti-skid chain fastened thereto, as indicated at 28. The other ends of these cross-links are fastened, as at 29, to a circularly extending chain having separable ends which fasten together in the usual way with a suitable fastener 30 of a quickly detachable type, whereby to permit easy application and removal of the chains. The blade 6'' in addition to serving the antiskid function like the blades 6 and 6', takes the place of the circularly extending chain on its side of the tire, because all of the cross-links are fastened at one end to the blade. This, therefore, means a saving in the cost of chains. The combination of the chains with the antiskid blade is of advantage because the chains afford the desired traction and to some degree also antiskid protection, although the principal antiskid protection with this combination is afforded by the antiskid blade.

In operation, the antiskid blades 6, 6', and 6'' are arranged to cut into the road surface 7 with the peripheral cutting edge 10 only in the event the wheel tends to slide sidewise. The immediate traction afforded by the blades stops the skidding action the moment it commences. The fact that the antiskid blades are loosely mounted is of advantage not only from the standpoint that the blades are thereby assured of continuous engagement with the road surface, but also from the standpoint that the blades are free to tilt outwardly relative to the wheels about the cutting edge 10 as a fulcrum when the wheel starts to move sidewise, whereby the blade is assured of better traction on the road surface. There is also an advantage in this angular or cocking movement of the blade from the standpoint that the blade does not score the road surface with the slightest sidewise movement. Obviously the springs 20 will be provided light enough to allow the blades 6 and 6' to tilt in the manner described, and in the case of the blade 6'', the chains 27—29 will fit loosely enough on the tire to allow the slight amount of angular movement contemplated.

It is believed the foregoing description conveys a good understanding of the objects and advantages of my invention. The appended claims have been drawn with a view to covering all legitimate modifications and adaptations.

I claim:

1. A non-skid attachment for a vehicle wheel having a tire thereon, comprising an annular antiskid blade of rigid, continuous ring construction, adapted to be loosely mounted on the wheel for movement radially with respect thereto alongside the tire so as to engage the road surface and having, in acute angle relationship to the substantially vertical plane of the blade, an annular outwardly extending marginal road surface engaging portion terminating in a continuous substantially circular peripheral cutting edge defined between the outer face of said road surface engaging portion and the peripheral surface of said portion which are in acute angle relationship to one another.

2. A non-skid attachment for a vehicle wheel having a tire thereon, of an annular antiskid blade of rigid, continuous ring construction, disposed alongside the tire and having an angularly extending marginal road surface engaging portion terminating in a continuous substantially circular peripheral cutting edge defined between surfaces in acute angle relationship defined between the outer face of said road surface engaging portion and the peripheral surface of said portion which are in acute angle relationship to one another, and means for mounting said blade on the wheel in floating relation thereto and with freedom to have angular movement relative to the wheel about its peripheral cutting edge as a fulcrum.

3. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, studs mounted on the wheel and extending outwardly therefrom through said openings and fitting loosely therein, whereby said blade is movable relative thereto and to said wheel, and means for retaining the arms on said studs.

4. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, studs mounted on the wheel and extending outwardly therefrom through said openings and fitting loosely therein, whereby said blade is movable relative thereto and to said wheel, and spring means on said studs for retaining the arms in place thereon, said means being yieldable to permit outward movement of the arms relative to the studs from a normal position.

5. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, a ring detachably secured to said wheel and having studs extending outwardly therefrom through said openings and fitting loosely therein, whereby said blade is movable relative thereto and to said wheel, and means for retaining the arms on said studs.

6. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, a ring detachably secured to said wheel and having studs extending outwardly therefrom through said openings and fitting loosely therein, whereby said blade is movable relative thereto and to said wheel, and spring means on said studs for retaining the arms in place thereon, said means being yieldable to permit outward movement of the arms relative to the studs from a normal position.

7. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, means secured to the spokes of the wheel and having studs extending outwardly therefrom through said openings and fitting loosely therein, whereby said blade is movable relative thereto and to said wheel, and means for retaining the arms on said studs.

8. The combination with a vehicle wheel having a tire thereon, of an annular antiskid blade disposed alongside the tire and having, in acute angle relationship to the substantially vertical plane of the blade, an annular outwardly extending marginal road surface engaging portion terminating in a peripheral cutting edge, said blade having three radially inwardly extending arms for mounting the same on the wheel, the arms being in approximately equally circumferentially spaced relation and having enlarged openings provided in the inner ends thereof, means secured to the spokes of the wheel and having studs extending outwardly therefrom through said openings and fitting loosely therein, whereby said blade is movable relative thereto and to said wheel, and spring means on said studs for retaining the arms in place thereon, said means being yieldable to permit outward movement of the arms relative to the studs from a normal position.

9. The combination with a vehicle wheel having a tire thereon, of an annular antiskid blade disposed alongside the tire and having a peripheral road engaging portion, said blade having three radially inwardly extending arms for mounting the same on the wheel, the arms being in approximately equally circumferentially spaced relation and having enlarged openings provided in the inner ends thereof, means secured to the spokes of the wheel and having studs extending outwardly therefrom through said openings and fitting loosely therein, whereby said blade is movable relative thereto and to said wheel, and spring means on said studs for retaining the arms in place thereon, said means being yieldable to permit outward movement of the arms relative to the studs from a normal position.

10. The combination with a vehicle wheel having a tire thereon, of an annular antiskid blade disposed alongside the tire and having a peripheral road engaging surface, said blade having three radially inwardly extending arms for mounting the same on the wheel, the arms being in approximately equally circumferentially spaced relation and having enlarged openings provided in the inner ends thereof, studs mounted on the wheel and extending outwardly therefrom through said openings and fitting loosely therein, whereby said blade is movable relative thereto and to said wheel, and means for retaining the arms on said studs.

11. The combination with a vehicle wheel having a tire thereon, of an annular antiskid blade disposed alongside the tire and having a peripheral road engaging portion, said blade having three radially inwardly extending arms for mounting the same on the wheel, the arms being in aproximately equally circumferentially spaced relation and having enlarged openings provided in the inner ends thereof, studs mounted on the wheel and extending outwardly therefrom through said openings and fitting loosely therein, whereby said blade is movable relative thereto and to said wheel, and spring means on said studs for retaining the arms in place thereon, said means being yieldable to permit outward movement of the arms relative to the studs from a normal position.

12. The combination with a vehicle wheel having a tire thereon, of an annular antiskid blade disposed alongside the tire and having a peripheral road engaging portion, said blade having three radially inwardly extending arms for mounting the same on the wheel, the arms being in approximately equally circumferentially spaced relation and having enlarged openings provided in the inner ends thereof, a ring detachably secured to said wheel and having studs extending outwardly therefrom through said openings and fitting loosely therein, whereby said blade is movable relative thereto and to said wheel, and means for retaining the arms on said studs.

13. As an article of manufacture, an antiskid blade for use alongside of and substantially concentric with a vehicle wheel, said blade comprising a ring of rigid sheet material flat in cross-section in a plane parallel to the side of the wheel and tire alongside which the blade operates, the blade having the outer marginal portion thereof extending at an acute angle to the plane thereof to provide a rigid peripheral road engaging edge portion.

14. As an article of manufacture, an antiskid blade for use alongside of and substantially concentric with a vehicle wheel, said blade comprising a ring of rigid sheet material flat in cross-section in a plane parallel to the side of the wheel and tire alongside which the blade operates, the blade having the outer marginal portion thereof extending at an acute angle to the plane thereof to provide a rigid peripheral road engaging edge portion, the periphery of said edge portion being beveled to provide a sharp edge and, adjacent thereto, an annular road engaging surface, every portion of which is substantially normal to the plane of the ring.

15. As an article of manufacture, an antiskid blade for use alongside of and substantially concentric with a vehicle wheel, said blade comprising a ring of rigid sheet material flat in cross-section in a plane parallel to the side of the wheel and tire alongside which the blade operates, the blade having the outer marginal portion thereof extending at an acute angle to the plane thereof to provide a rigid peripheral road engaging edge portion, the periphery of said edge portion being beveled to provide a sharp edge, and adjacent thereto, an annular road engaging surface, said ring having arms extending substantially radially inwardly therefrom in substantially equally circumferentially spaced relation.

WALTER E. LINCOLN.

CERTIFICATE OF CORRECTION.

Patent No. 2,178,592. November 7, 1939.

WALTER E. LINCOLN.

It is hereby certified that error appears in the printed specification of the above numbered patent requiring correction as follows: Page 2, second column, line 46, claim 2, for the word "of" read comprising; line 47, after "construction," insert adapted to be; line 48, strike out "an angularly" and insert instead the comma and words , in acute angle relationship to the substantially vertical plane of the blade, an annular outwardly; lines 51 and 52, same claim, strike out "defined between surfaces in acute angle relationship; and that the said Letters Patent should be read with this correction therein that the same may conform to the record of the case in the Patent Office.

Signed and sealed this 2nd day of January, A. D. 1940.

Henry Van Arsdale, (Seal) Acting Commissioner of Patents.